United States Patent [19]

Giammarrusco

[11] Patent Number: 4,513,233
[45] Date of Patent: Apr. 23, 1985

[54] PULSE MONITOR CIRCUIT FOR USE AS A FAN SPEED MONITOR

[75] Inventor: David P. Giammarrusco, Bartlett, Ill.

[73] Assignee: GTE Automatic Electric Incorporated, Northlake, Ill.

[21] Appl. No.: 564,260

[22] Filed: Dec. 22, 1983

[51] Int. Cl.³ ............................................. G05B 23/02
[52] U.S. Cl. ...................................... 318/565; 361/23; 236/89
[58] Field of Search ........... 318/565, 138, 254, 254 A, 318/439, 327; 340/825.06, 825.16, 825.17, 825.18; 361/1, 23, 25; 236/67, 89

[56] References Cited

U.S. PATENT DOCUMENTS

| 3,800,188 | 3/1974 | Wilke | 361/1 |
| 3,971,974 | 7/1976 | Ichiyanagi | 318/327 X |
| 4,079,432 | 3/1978 | Godfrey | 361/23 |
| 4,259,625 | 3/1981 | Hatakeyama et al. | 318/328 |
| 4,346,371 | 8/1982 | Ida | 361/23 X |

FOREIGN PATENT DOCUMENTS

| 143192 | 8/1980 | Fed. Rep. of Germany | 318/327 |
| 162148 | 12/1979 | Japan | 318/565 |
| 76927 | 6/1980 | Japan | 361/1 |
| 2042191 | 9/1980 | United Kingdom | 361/1 |

OTHER PUBLICATIONS

IBM Technical Disclosure Bulletin, "Digital Velocity Servomechanism", vol. 14, No. 3, Aug. 1971.

Primary Examiner—William M. Shoop
Assistant Examiner—Bentsu Ro
Attorney, Agent, or Firm—Robert J. Black; Gregory G. Hendricks

[57] ABSTRACT

A circuit which monitors air flow by comparing the speed of a fan to a predetermined frequency. A Hall effect device detects magnetic pulses representative of the fan speed and provides a corresponding electrical signal. This signal is compared with a predetermined threshold frequency by a retriggerable monostable multivibrator. A digital delay circuit isolates pace conditions and a relay circuit provides an indication of the fan speed status.

13 Claims, 1 Drawing Figure

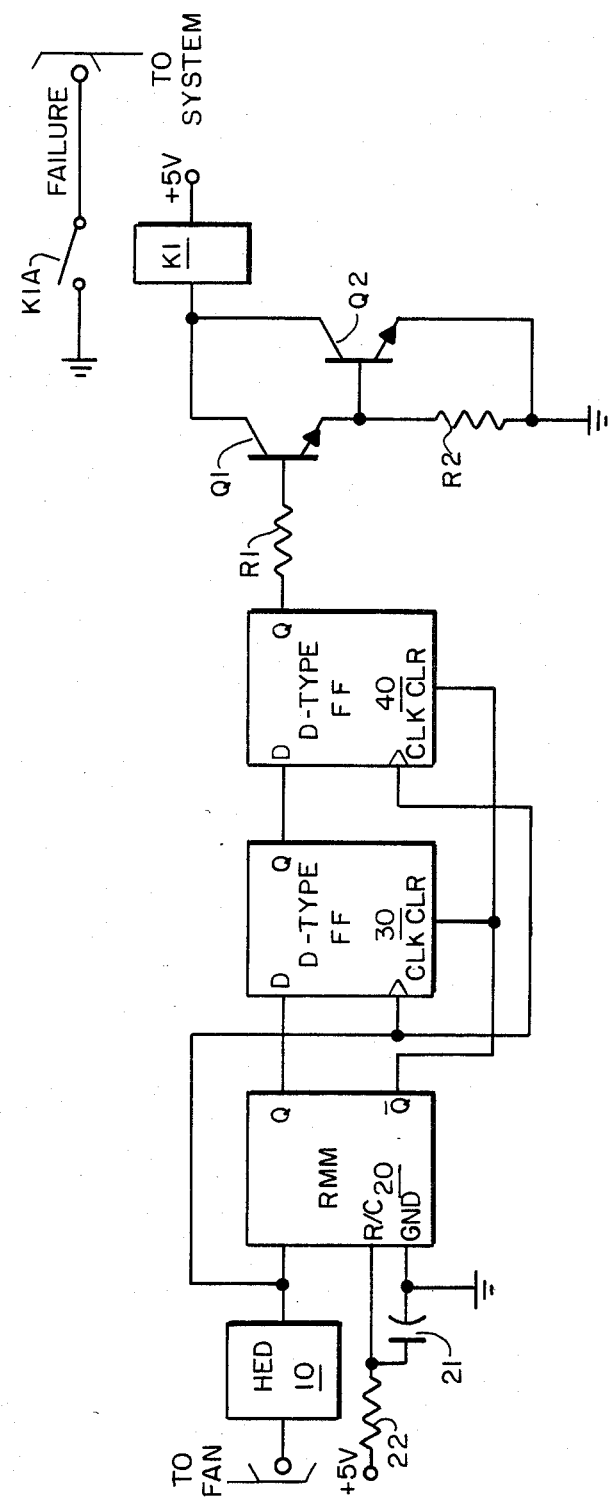

4,513,233

PULSE MONITOR CIRCUIT FOR USE AS A FAN SPEED MONITOR

FIELD OF THE INVENTION

The present invention relates to electric fans and more particularly to a circuit which monitors the speed of a connected electric fan.

BACKGROUND OF THE INVENTION

Fans are often used to cool electronic equipment. However, failure or reduced speed of the fan can result in overheating and failure or erroneous operation of the fanned electronic equipment. Monitors are often connected to fans in order to detect abnormally slow fan speeds. These monitors provide fan failure signals as an indication that the fanned electronic equipment may not be operating properly.

Bi-metal air flow sensors are typically used as fan speed monitors. These sensors utilize a differential expansion principle in which the air entering an inlet of the sensor, circulates and cools the electrically heated bi-metal material. When the air flow drops below the nominal setting, the termperature of the bi-metal element rises quickly, closing a contact which provides a fan failure signal. Typical examples of such sensors are the series LS air flow sensors from the Warren Communications division of General Signal Corporation. However, such air flow sensors also generate heat and their response time varies, depending on the monitored air velocity. In addition the preset or nominal air flow thresholds of such sensors are limited and inflexible.

SUMMARY OF THE INVENTION

In accordance with the present invention a magnetic pulse monitor circuit is provided for use in a system which includes a source of periodic magnetic flux signals. The magnetic pulse monitor circuit comprises magnetic flux sensing means which is connected in magnetic flux proximity to the source of periodic magnetic flux signals and is operative in response to the periodic magnetic flux signals to provide corresponding periodic magnetic flux detection signals.

The pulse monitor circuit also includes detection means which is connected to the magnetic flux sensing means and is operative in response to periodic magnetic flux detection signals having a frequency greater than or equal to a predetermined frequency to provide a first frequency detection signal, and which is operative in response to periodic magnetic flux detection signals having a frequency less than the predetermined frequency to provide a second frequency detection signal.

The pulse monitor circuit also includes timing means which is connected to the detection means and the magnetic flux sensing means and which is operative in response to the first frequency detection signal and a magnetic flux detection signal to provide a first timing signal, and which is operative in response to the second frequency detection signal to provide a second timing signal.

The pulse monitor circuit further includes storage means which is connected to the timing means and is operative in response to the first timing signal to provide a status signal of a first characteristic, and which is operative in response to the second timing signal to provide a status signal of a second characteristic.

DESCRIPTION OF THE DRAWING

The single FIGURE of the accompanying drawing is a combined block, logic and schematic diagram of a pulse monitor circuit for use as a fan speed monitor in accordance with the present invention.

DESCRIPTION OF THE PREFERRED EMBODIMENT

Referring now to the accompanying drawing the pulse monitor circuit of the present invention is shown. Hall effect device (HED) 10 is connectable to the fan to be monitored, and it is connected to retriggerable monostable multivibrator (RMM) 20. Capacitor 21 is connected to ground and across the GND and R/C terminals of multivibrator 20. Resistor 22 is connected between a +5 volt source and the R/C terminal. The Q output of this multivibrator is connected to the data (D) input of D-type flip-flop 30 and the $\overline{Q}$ output of RMM 20 is connected to the clear (CLR) input of D-type flip-flops 30 and 40. The clock (CLK) input of these flip-flops is connected to Hall effect device 10. The Q output of flip-flop 30 is connected to the D input of flip-flop 40 and the Q output of this flip-flop is connected to the base of transistor Q1 via resistor R1. The emitter of transistor Q1 is connected to the base of transistor Q2 and to resistor R2 which is connected both to ground and the emitter of transistor Q2. The collector of both of these transistors is connected to each other and to relay K1A which is connected to a +5 volt source. Relay contact K1 is connectable to an external system and when closed it is also connected to ground.

When the fan rotates it generates a magnetic field which is interrupted once for each revolution of the fan. The speed of the fan is proportional to the rate of air flow. For each cooling application the speed of the fan must be above some predetermined number of revolutions per minute (RPM) in order to provide adequate cooling.

The present invention is designed for an application in which a fan speed of 2000 RPM is required in order to cool the fanned electronic equipment and thereby prevent overheating and the resultant failure or erroneous operation of that equipment.

RMM 20 operates as a frequency discriminator. The capacitance and resistance values of capacitor 21 and resistor 22, respectively, are chosen such that RMM 20 generates a signal having a 30 millisecond (ms) pulse width. This signal corresponds to 2000 pulses per minute or a fan speed of 2000 RPM.

When connected to a monitored fan, Hall effect device (HED) 10 senses the pulsing magnetic field generated by that fan. HED 10 produces a signal having the same frequency as the RPM rate of the fan. If the fan speed is greater than 2000 RPM, then the period of the pulse train from HED 10 will be less than 30 ms. As long as the period of this pulse train remains below 30 ms, RMM 20 will be continuously retriggered before it times out.

In this retriggered state RMM 20 provides a logic level 1 signal at its Q output and a logic level 0 signal at its $\overline{Q}$ output. The CLR inputs of flip-flops 30 and 40 are active when "high" so these flip-flops are not cleared by the logic level 0 signal from the $\overline{Q}$ output of RMM 20.

D-type flip-flops 30 and 40 latch the signal from the Q output of RMM 20 and also prevent potential race conditions from causing erratic operation of relay K1. The pulse train from HED 10, which keeps RMM 20 retriggered, is the same signal which is applied to the clock input of D-type flip-flops 30 and 40. The logic level 1 signal from the Q output of RMM 20 appears at the D input of D-type flip-flop 30. This signal is clocked into flip-flop 30 on the next clock pulse and it then appears at the Q output of flip-flop 30.

Consequently, a logic level 1 signal then appears at the D input of flip-flop 40. This signal is clocked into flip-flop 40 on the next clock pulse and it then appears at the Q output of flip-flop 40. A logic level 1 signal then appears at the base of transistor Q1 and causes it to turn on. This causes transistor Q2 to also turn on. Since these transistors are connected in a Darlington configuration, they both supply drive current to operate relay K1 which functions as a signalling means. When this relay operates, contacts K1A close and connect the failure lead to ground. This ground connection provides a signal to the external system that the fan is operating properly.

If the fan stops running or even slows down to less than 2000 RPM, the period of the pulse stream from HED 10 will be greater than 30 ms. Pulses of this frequency do not occur often enough to keep RMM 20 retriggered. Consequently, RMM 20 times out and provides logic level 0 and 1 signals at its Q and $\overline{Q}$ outputs, respectively. The logic level 1 signal from the $\overline{Q}$ output appears at the CLR input of flip-flops 30 and 40, causing them to reset and provide logic level 0 signals at their Q outputs.

The logic level 0 signal at the Q output of flip-flop 40 appears at the base of transistor Q1. Consequently, this transistor turns off and causes transistor Q2 to also turn off. When these transistors turn off, the drive current for relay K1 is removed, so this relay is restored to its unoperated state and contacts K1A open. The absence of a ground connection on the failure lead is a signal to the external system that the fan has failed or is not operating properly.

Flip-flops 30 and 40 are slow to turn on and fast to clear since they operate as a digital delay line or storage means with direct clear. This arrangement prevents relay K1 from chattering when the pulse train from HED 10 passes through the retrigger/time-out interval.

This dual flip-flop arrangement also prevents erroneous operation of relay K1 due to setup violations of the clock input of flip-flop 30. Since flip-flop 30 is clocked by the same signal that clocks RMM 20, it is possible that a race condition could exist and flip-flop 30 could be clocked before the data appearing at its input became stable. Thus, an erroneous output signal would drive relay K1 if flip-flop 40 was not utilized.

However, with the dual flip-flop arrangement of the present invention this race condition has no effect since the signal appearing at the D input of flip-flop 40 is provided by flip-flop 30. Now, even if a transient signal appears at the D input of flip-flop 30, that signal has no effect because the signal appearing at the D input of flip-flop 40 comes from flip-flop 30 and that flip-flop is stable long before flip-flop 40 is clocked. Flip-flop 30 is potentially unstable only immediately after a clock pulse. Thus, whenever flip-flop 40 is clocked, stable data appears at its D input so only valid signals appear at its output and therefore relay K1 is not subject to erroneous drive signals.

The pulse monitor circuit of the present invention thus provides a novel arrangement for monitoring fan speed and therefore air flow. This invention includes a novel arrangement of a Hall effect device, a retriggerable monostable multivibrator, a pair of D-type flip-flops and a relay circuit.

It will be obvious to those skilled in the art that numerous modifications of the present invention can be made without departing from the spirit of the invention which shall be limited only by the scope of the claims appended hereto.

What is claimed is:

1. A magnetic pulse monitor circuit for use in a system which includes a source of periodic magnetic flux signals, said magnetic pulse monitor circuit comprising:

magnetic flux sensing means which is connected in magnetic flux proximity to said source of periodic magnetic flux signals and its operative in response to said periodic magnetic flux signals to provide corresponding periodic magnetic flux detection signals;

detection means which is connected to said magnetic flux sensing means and is operative in response to periodic magnetic flux detection signals having a frequency greater than or equal to a predetermined frequency to provide a first frequency detection signal, and which is operative in response to periodic magnetic flux detection signals having a frequency less than said predetermined frequency to provide a second frequency detection signal;

storage means which is connected to said detection means and said magnetic flux sensing means and is operative in response to said first frequency detection signal and a magnetic flux detection signal to provide a first storage signal, and which is operative in response to said second frequency detection signal to provide a second storage signal; and signalling means which is connected to said storage means and is operative in response to said first storage signal to provide a status signal of a first characteristic, and which is operative in response to said second storage signal to provide a status signal of a second characteristic.

2. A magnetic pulse monitor circuit as claimed in claim 1, wherein said magnetic flux sensing means comprises a Hall effect device.

3. A magnetic pulse monitor circuit as claimed in claim 1, wherein said detection means comprises a retriggerable monostable multivibrator having first and second outputs which provide said first and second frequency detection signals, respectively.

4. A magnetic pulse monitor circuit as claimed in claim 3, wherein said storage means comprises a D-type flip-flop having a data input connected to said first output of said retriggerable monostable multivibrator, a clock input connected to said magnetic flux sensing means, a clear input connected to said second output of said retriggerable monostable multivibrator, and further having an output which provides said first and second storage signals.

5. A magnetic pulse monitor circuit as claimed in claim 3, wherein said storage means comprises: first and second D-type flip-flops each having a clear input connected to said second output of said retriggerable monostable multivibrator, and a clock input connected to said magnetic flux sensing means, said first D-type flip-flop also having a data input connected to said first output of said retriggerable monostable multivibrator and further having an output, said second D-type flip-flop also having a data input connected to said output of said first D-type flip-flop and further having an output which provides said first and second storage signals.

6. A magnetic pulse monitor circuit as claimed in claim 4, wherein said signalling means comprises a relay connected to the output of said D-type flip-flop, and a pair of relay contacts, said relay being operative in response to said first storage signal to cause said relay contacts to come into a first position relative to each other thereby providing said status signal of a first characteristic, and said relay being operative in response to said second storage signal to cause said relay contacts to come into a second position relative to each other, thereby providing said status signal of a second characteristic.

7. A magnetic pulse monitor circuit as claimed in claim 5, wherein said signalling means comprises a relay connected to the output of said second D-type flip-flop, and a pair of relay contacts, said relay being operative in response to said first storage signal to cause said relay contacts to come into a first position relative to each other, thereby providing said status signal of a first characteristic, and said relay being operative in response to said second storage signal to cause said relay contacts to come into a second position relative to each other, thereby providing said status signal of a second characteristic.

8. A pulse monitor circuit for use in a system which includes a source of periodic pulse signals, said pulse monitor circuit comprising:
    detection means which is connected to said source of periodic pulse signals and is operative in response to said periodic pulse signals having a frequency greater than or equal to a predetermined frequency to provide a first frequency detection signal, and which is operative in response to said periodic pulse signals having a frequency below said predetermined frequency to provide a second frequency detection signal;
    storage means which is connected to said detection means and said magnetic flux sensing means and is operative in response to said first frequency detection signal and a magnetic flux detection signal to provide a first storage signal, and which is operative in response to said second frequency detection signal to provide a second storage signal; and
    signalling means which is connected to said storage means and is operative in response to said first storage signal to provide a status signal of a first characteristic, and which is operative in response to said second storage signal to provide a status signal of a second characteristic.

9. A pulse monitor circuit as claimed in claim 8, wherein said detection means comprises a retriggerable monostable multivibrator having first and second outputs which provide said first and second frequency detection signals, respectively.

10. A pulse monitor circuit as claimed in claim 9, wherein said storage means comprises a D-type flip-flop having a data input connected to said first output of said retriggerable monostable multivibrator, a clock input connected to said source of periodic pulse signals, a clear input connected to said second output of said retriggerable monostable multivibrator, and further having an output which provides said first and second storage signals.

11. A pulse monitor circuit as claimed in claim 9, wherein said storage means comprises: first and second D-type flip-flops each having a clear input connected to said second output of said retriggerable monostable multivibrator, and a clock input connected to said source of periodic pulse signals, said first D-type flip-flop also having a data input connected to said first output of said retriggerable monostable multivibrator and further having an output, said second D-type flip-flop also having a data input connected to said output of said first D-type flip-flop and further having an output which provides said first and second storage signals.

12. A pulse monitor circuit as claimed in claim 10, wherein said signalling means comprises a relay connected to the output of said D-type flip-flop, and a pair of relay contacts, said relay being operative in response to said first storage signal to cause said relay contacts to come into a first position relative to each other thereby providing said status signal of a first characteristic, and said relay being operative in response to said second storage signal to cause said relay contacts to come into a second position relative to each other, thereby providing said status signal of a second characteristic.

13. A pulse monitor circuit as claimed in claim 11, wherein said signalling means comprises a relay connected to the output of said second D-type flip-flop, and a pair of relay contacts, said relay being operative in response to said first storage signal to cause said relay contacts to come into a first position relative to each other, thereby providing said status signal of a first characteristic, and said relay being operative in response to said second storage signal to cause said relay contacts to come into a second position relative to each other, thereby providing said status signal of a second characteristic.

* * * * *